(No Model.) 7 Sheets—Sheet 1.

J. W. BLOOD.
GRAIN BINDER.

No. 413,016. Patented Oct. 15, 1889.

Witnesses
W. C. Corlies
Irene Miller

Inventor
Joseph W. Blood
By Coburn & Thacher
Attorneys

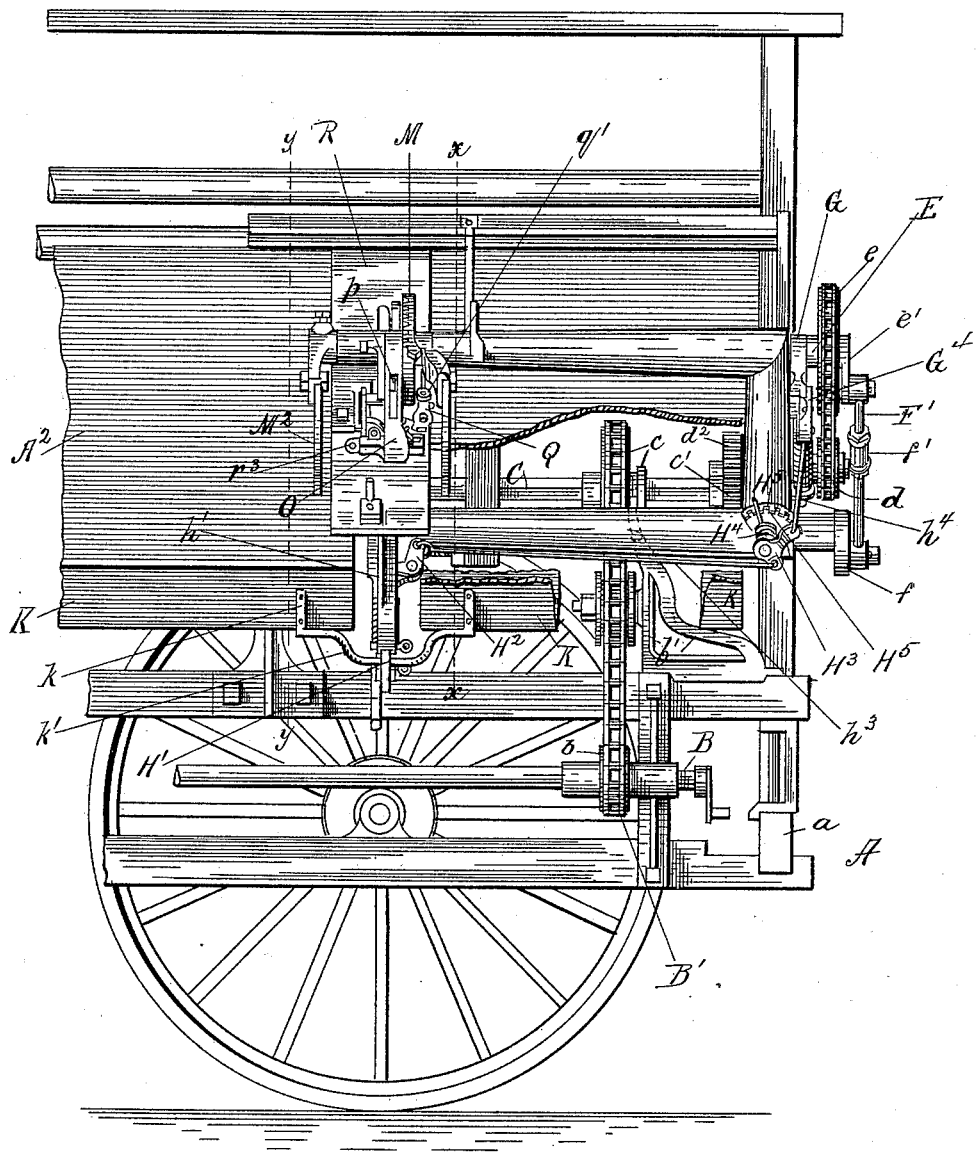

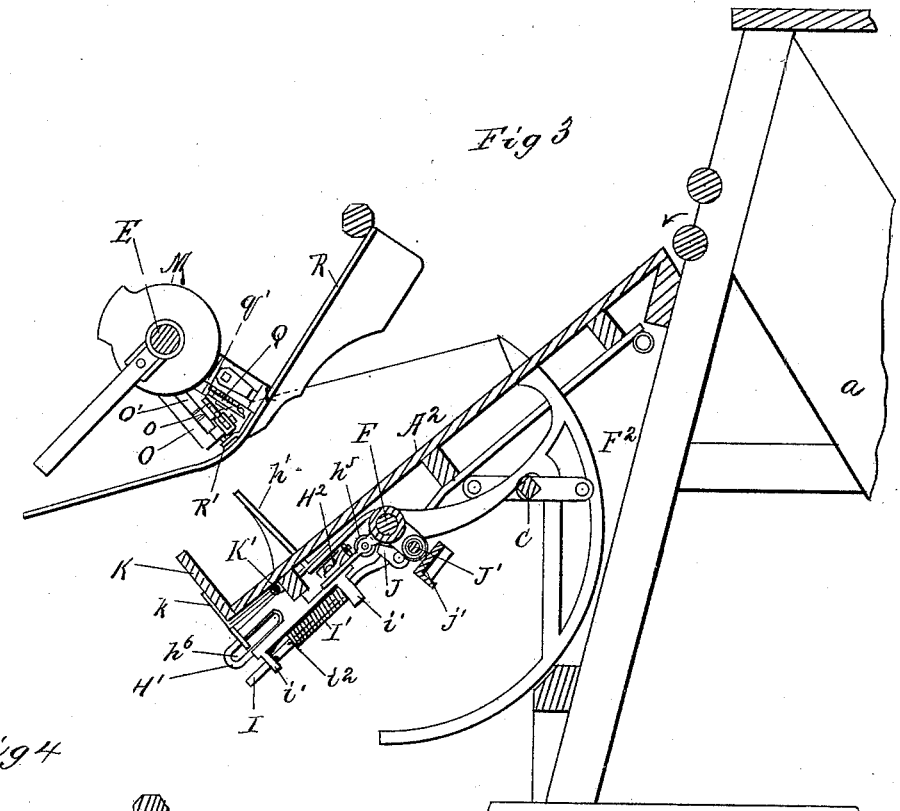
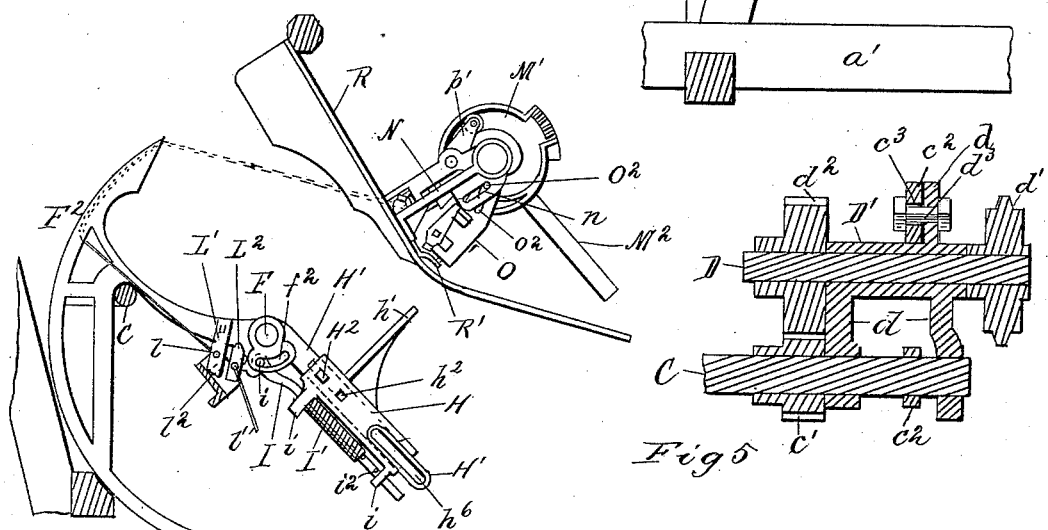

(No Model.) 7 Sheets—Sheet 4.
J. W. BLOOD.
GRAIN BINDER.
No. 413,016. Patented Oct. 15, 1889.
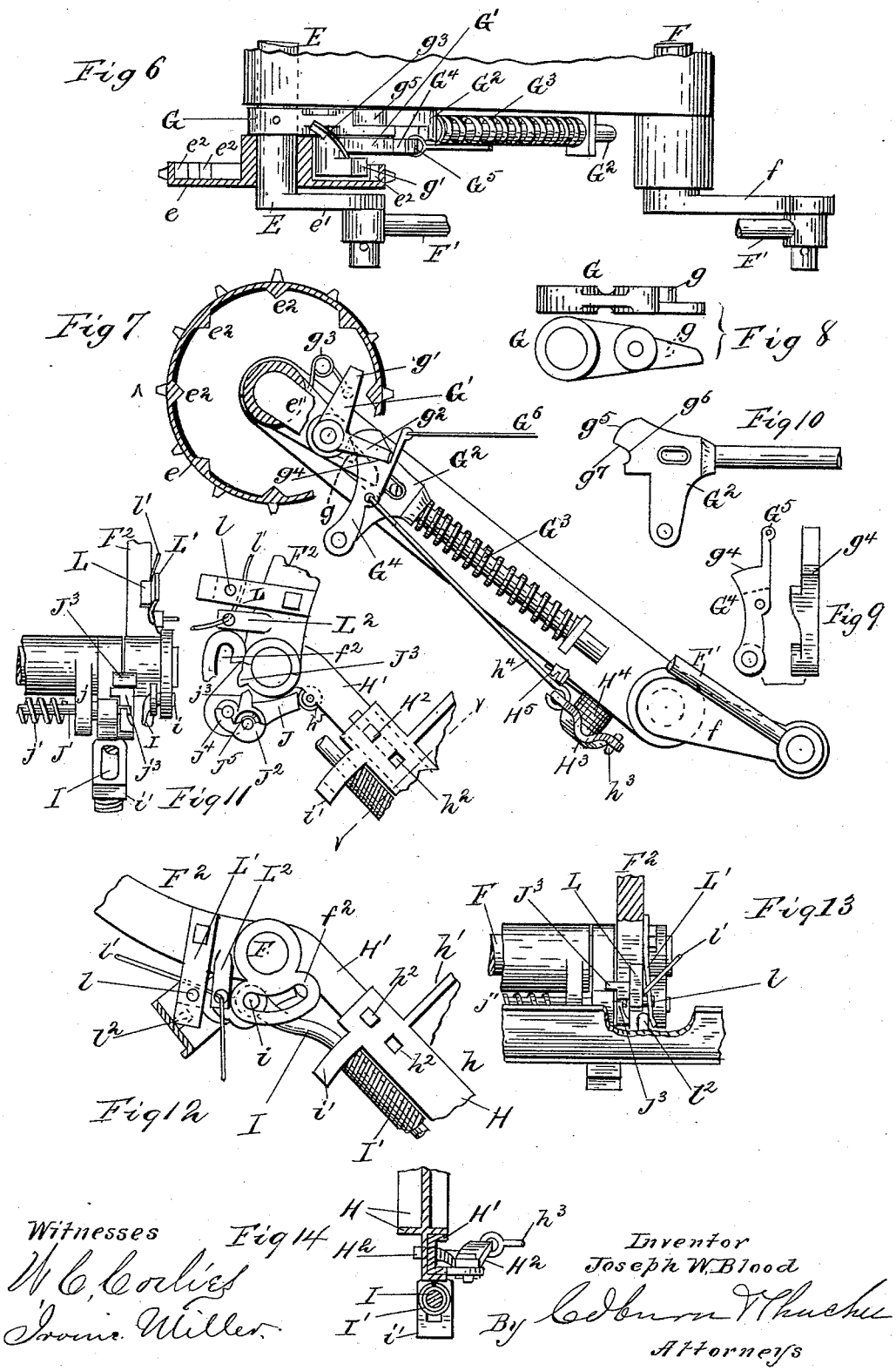
Witnesses
W. C. Coolies
Irving Miller
Inventor
Joseph W. Blood
By Coburn & Thacher
Attorneys

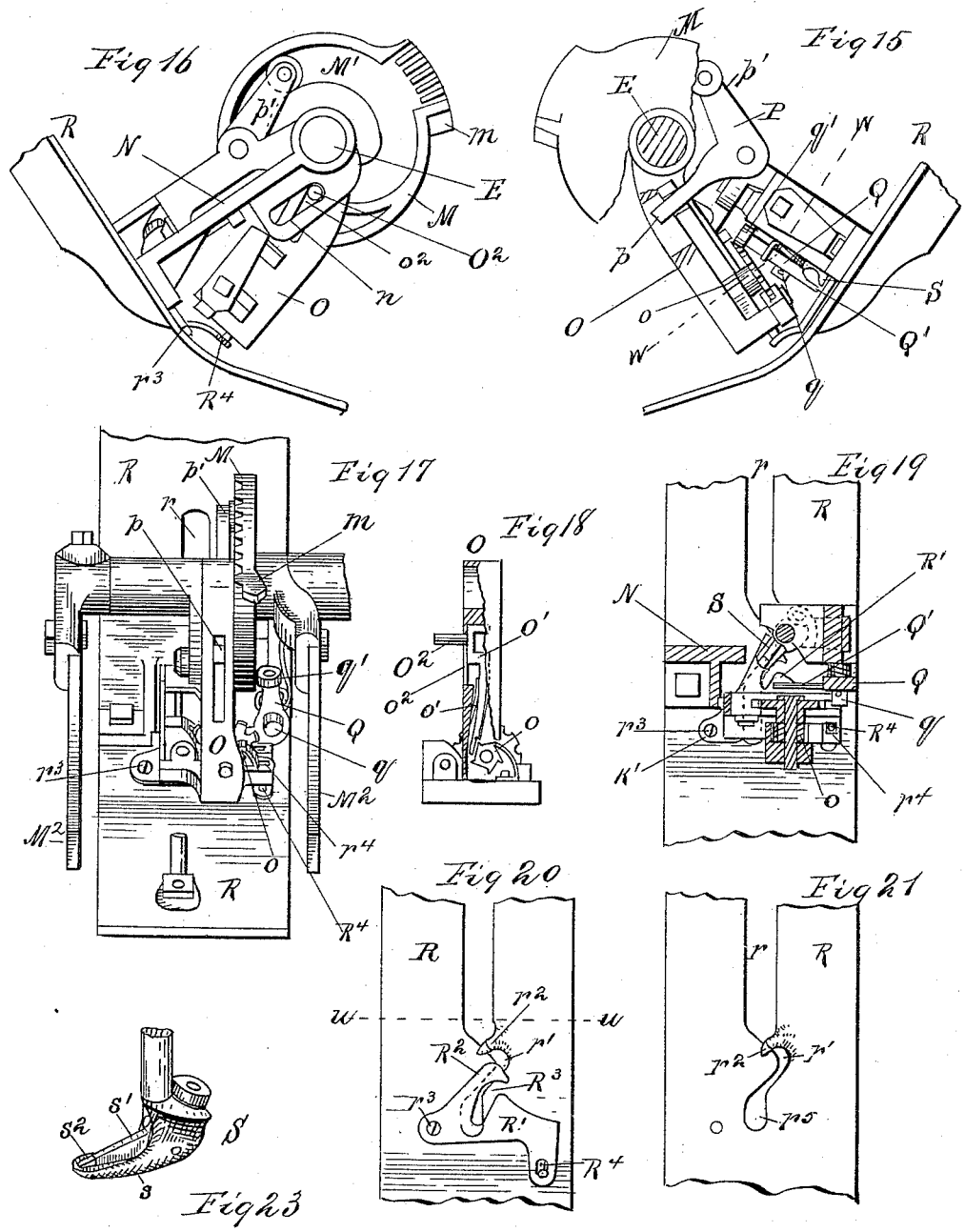

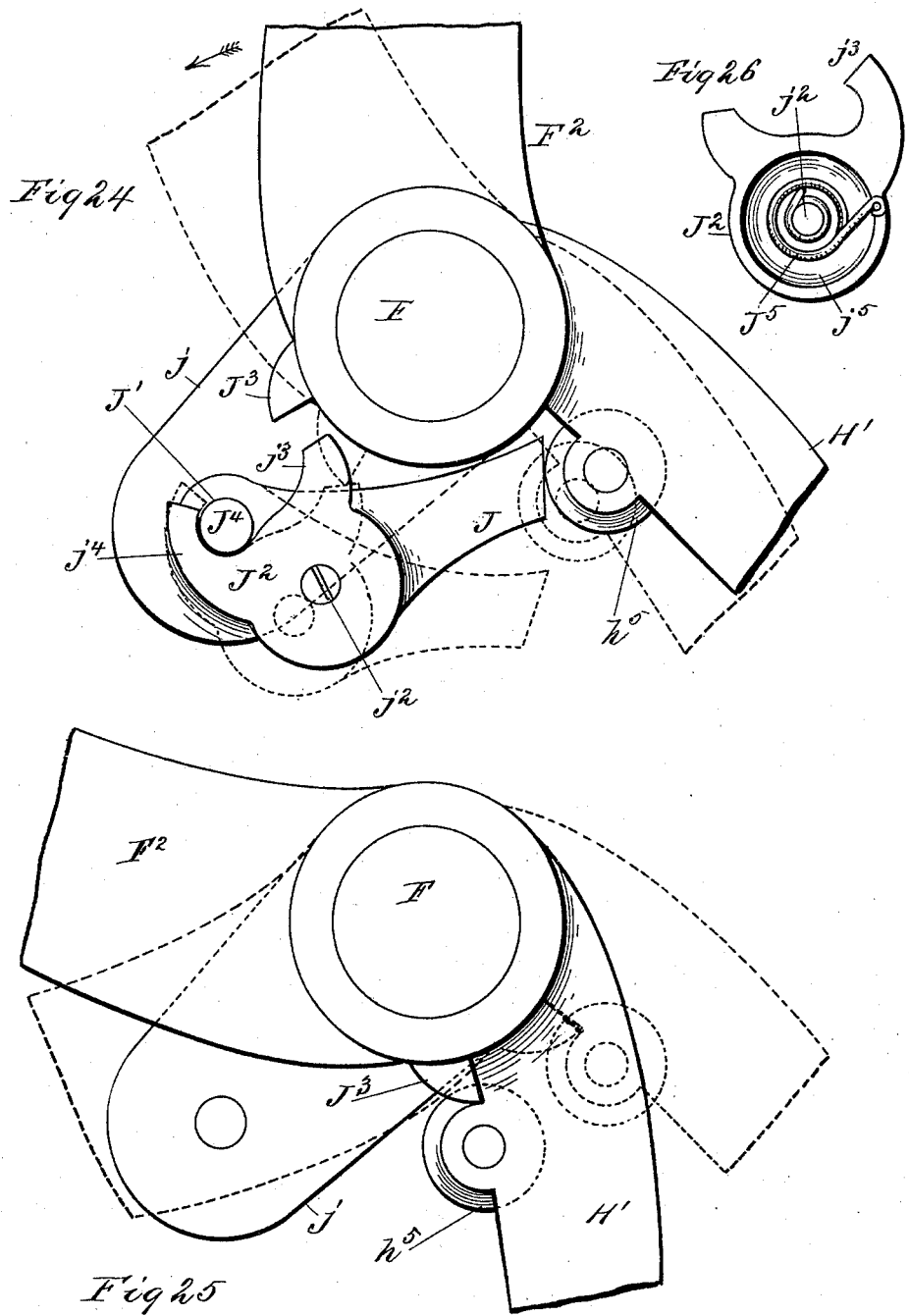

(No Model.) 7 Sheets—Sheet 7.

J. W. BLOOD.
GRAIN BINDER.

No. 413,016. Patented Oct. 15, 1889.

Witnesses
Inventor
Joseph W. Blood

UNITED STATES PATENT OFFICE.

JOSEPH W. BLOOD, OF PLANO, ILLINOIS, ASSIGNOR OF ONE-HALF TO THE PLANO MANUFACTURING COMPANY, OF SAME PLACE.

GRAIN-BINDER.

SPECIFICATION forming part of Letters Patent No. 413,016, dated October 15, 1889.

Application filed July 22, 1885. Serial No. 172,347. (No model.)

*To all whom it may concern:*

Be it known that I, JOSEPH W. BLOOD, a citizen of the United States, residing at Plano, in the county of Kendall and State of Illinois, have invented a certain new and useful Improvement in Grain-Binders, which is fully set forth and described in the annexed specification, reference being had to the accompanying drawings, in which—

Figure 1:
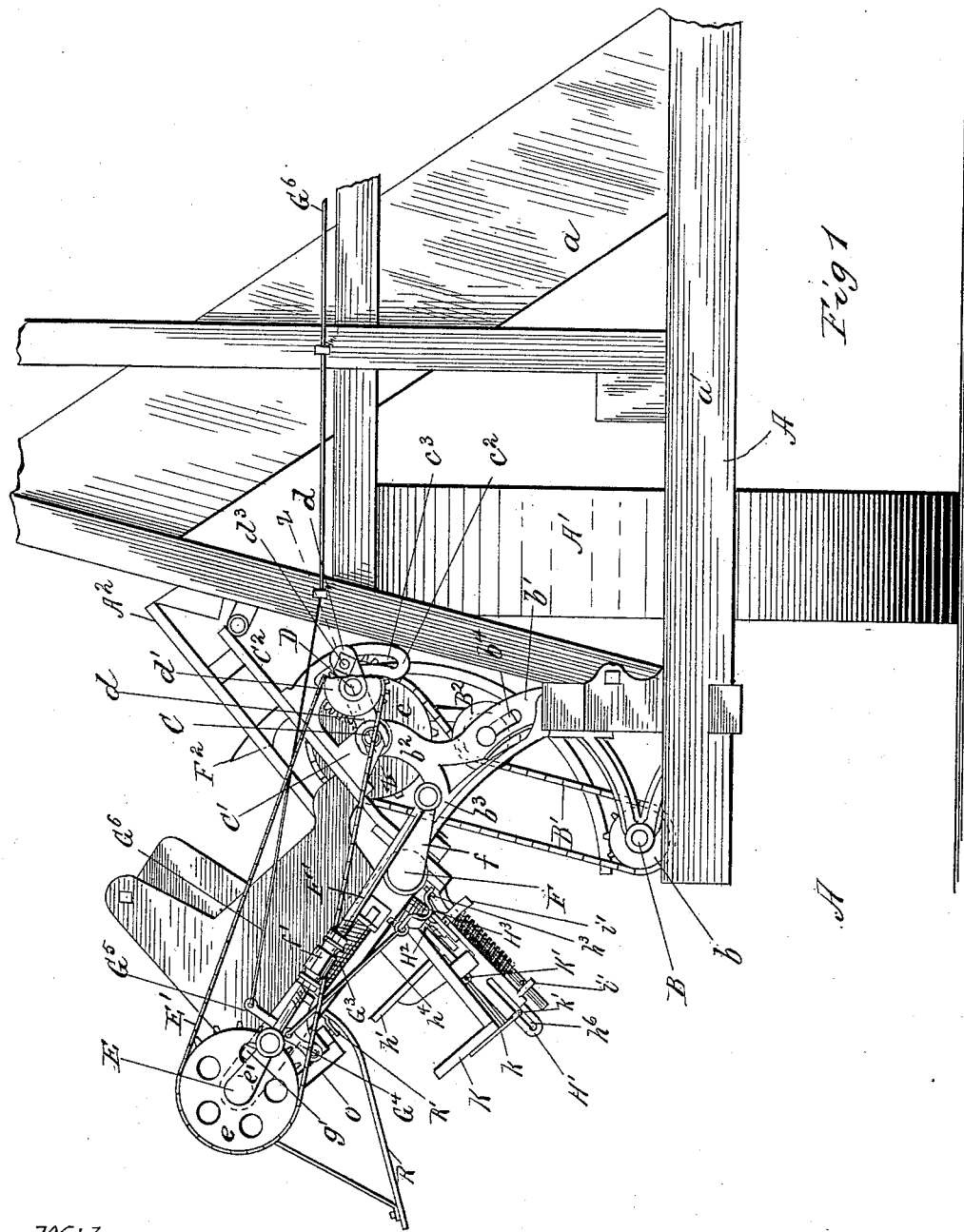
Figure 27:
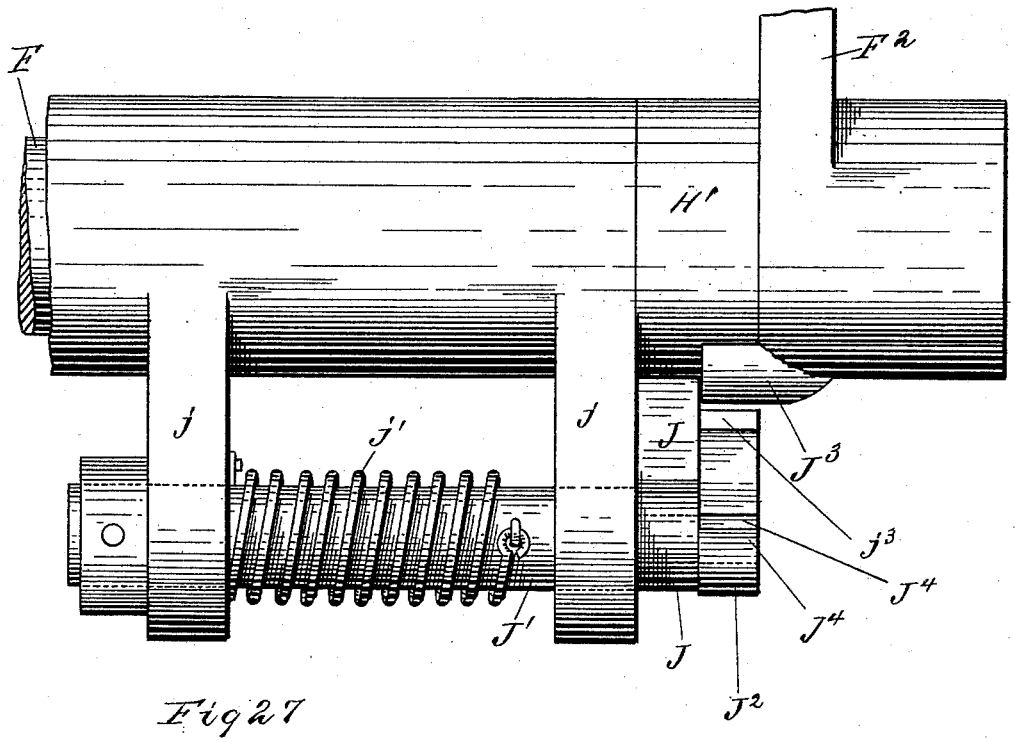

Figure 1 represents a front elevation of a part of the harvester and a front end elevation of the binder attached embodying my improvements; Fig. 2, a front side elevation of the binder in its place on the machine; Fig. 3, a detail section of the same, taken on the line $x\ x$, Fig. 2; Fig. 4, a similar section taken on the line $y\ y$, Fig. 2; Fig. 5, a detail plan section taken on the line $z\ z$, Fig. 1; Fig. 6, a detail plan of the stop mechanism; Fig. 7, a side elevation of the same; Fig. 8, plan and side views of the clutch-arm detached; Fig. 9, similar views of the stop-arm detached; Fig. 10, a detail side elevation of the sliding arm for the clutch; Fig. 11, detail side and rear elevations of the compressing devices; Fig. 12, a similar side elevation with the needle-arm down; Fig. 13, a rear elevation of the same as shown in the last figure; Fig. 14, a detail section taken on the line $v\ v$, Fig. 11; Fig. 15, a front side elevation of the knotting mechanism detached; Fig. 16, a rear side elevation of the same; Fig. 17, a front elevation of the same; Fig. 18, a detail elevation of the cord-holder; Fig. 19, a plan section taken on the line $w\ w$, Fig. 15; Fig. 20, a detail plan of the breast-plate detached; Fig. 21, a similar view of the same with the cord-stop removed; Fig. 22, a plan section of the same, taken on the line $u\ u$, Fig. 20; Fig. 23, an elevation of the knotting-hook detached; Fig. 24, a detail side elevation of the needle-arm and trip-support and catch, the parts being shown in different positions by dotted lines; Fig. 25, a similar view of the same parts just after the discharge of the bundle; Fig. 26, a rear elevation of the spring-pawl on the trip-supporting arm detached; Fig. 27, a detail elevation of the inner end of the needle-shaft journal and adjacent parts, and Fig. 28 a perspective view of the end-gate viewed from below.

Figure 28:
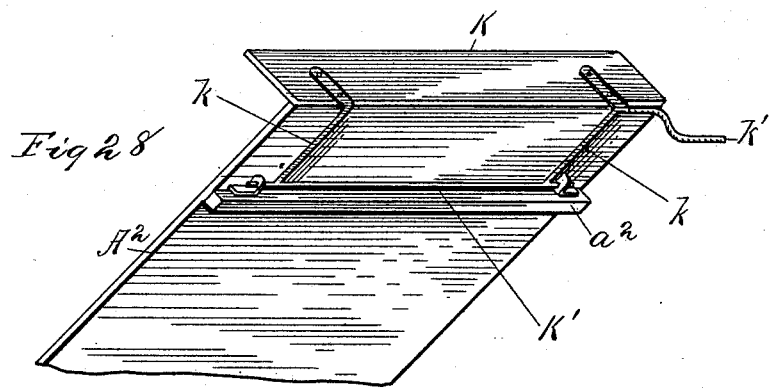

The figures of the drawings are on three different scales—viz., Figs. 1 to 4, inclusive, and Fig. 28 are on one scale, Figs. 5 to 23, inclusive, are on another scale twice as large as the former, and Figs. 24 to 27, inclusive, are on still another scale, twice as large as the last, being about the same as in a full-size machine.

My invention relates to automatic grain-binders of that class in which an automatic trip mechanism is employed for the purpose of sizing the bundles.

The object of the invention is the improvement of various parts of the machine, as will be hereinafter more fully set forth.

I will proceed to describe in detail the construction and operation of a complete machine in which I have embodied my invention in one practical form, and will then point out definitely in the claims the special improvements which I believe to be new and desire to protect by Letters Patent.

The main parts of the harvester may be of any ordinary construction, and a description of these well-known devices is not necessary here and will not be given. Some few of these parts will be referred to simply for the purpose of determining the relation of the binding-machine thereto. I will also state that very many of the main devices of the grain-binder are of ordinary construction and will need no explanation here, and therefore, if mentioned at all, will be referred to simply by letter without special description.

In the drawings, A represents a part of the main or supporting frame of a harvesting-machine, $a$ being a part of the elevator-frame, and $a'$ the horizontal front sill of the harvester-frame. The main or ground wheel A' is mounted, as usual, in this portion of the main frame, and B is the crank-shaft which drives the cutters, and is arranged outside the wheel, from which it receives motion in any usual manner.

I will first describe the mechanisms for driving the grain-binder, which are somewhat different from those usually employed.

The packer-shaft C is mounted in suitable bearings on the frame of the binder in any ordinary way. In the drawings the bearing for the forward end of this shaft is shown in a bracket C', which is fastened to the under side of the strap C² below the deck. A sprocket-wheel $b$ is fixed on the crank-shaft B, and a similar wheel $c$ is secured to the packer-shaft, but so as to slide thereon, and a chain B', passing over these wheels, communicates motion from the crank-shaft to the packer-shaft. Forward of the wheel $c$ a short counter-shaft D is mounted in a sleeve-bearing D', which is supported by arms $d$, pivoted on the packer-shaft, as shown in Fig. 5 of the drawings. On the outer end of this shaft is a sprocket-wheel $d'$, and on the inner end a gear-pinion $d^2$, with which a similar pinion $c'$ on the packer-shaft engages.

The knotter-operating shaft E of the binder is provided, as usual, with a wheel $e$ on its forward end; but in this instance this wheel is a chain or sprocket wheel, and it is loose on the shaft and driven by means of a chain E', running from the sprocket-wheel $d'$ on the outer end of the counter-shaft D. It is obvious from the description already given that the arms in which this counter-shaft is mounted are vibratable about the packer-shaft, from which they extend inward. By this movement the sprocket-wheel may be adjusted so as to keep the drive-chain E' taut, and in order to fix its position the forward arm $d$ is extended beyond the shaft somewhat by the side of a curved arm $c^2$, depending from the bracket C' and provided with a curved slot $c^3$. A bolt $d^3$ passes through this slot and the projecting end of the arm $d$, outside of which it is secured by a nut, by means of which the arm is fastened to the bracket in any position to which it may be adjusted. A metal standard $b'$ is bolted to one of the sills of the harvester-frame, being provided with a wide foot for this purpose. The upper end of this standard is branching. One arm $b^2$ of the branch is extended upward and inward and fitted to a groove in the boss of the wheel $c$ on the packer-shaft, while the other arm $b^3$ is extended upward and outward and is fitted under the sleeve-journal of the needle-shaft F. A chain-tightening wheel B² is mounted on a stub-journal which is secured to this standard, being passed through a slot $b^4$ therein, so as to be adjustable. The chain B' runs over this wheel, the proper adjustment of which loosens or tightens the chain. It will thus be seen that the standard supports the binder-frame by the branch $b^3$ under the needle-shaft sleeve, but permits the latter to slide thereon when the binder-frame is adjusted in the usual manner, and at the same time by its other branch $b^2$ holds the wheel $c$ in place while the packer-shaft slides through it under the adjustment of the binder.

Motion is communicated from the knotter-operating shaft E to the needle-shaft F by means of a pitman F', connecting the crank $e'$ on the forward end of the former shaft to the crank $f$ on the forward end of the latter shaft and converting the rotary motion of the one into a rocking motion of the other in the usual manner. The pitman F' is adjustable as to its length, being composed of two parts threaded at their adjacent ends and connected by a nut $f'$, which is double threaded and serves to accurately adjust the length of the pitman. The sprocket-wheel $e$ is mounted loosely upon the knotter-operating shaft E, and is connected thereto intermittently to cause the rotation of the shaft at suitable intervals by means of a suitable clutch mechanism. This mechanism I have shown in detail in Figs. 6 to 10, inclusive, of the drawings.

G indicates an arm rigidly attached to the shaft E and provided with a rounded point or nose $g$, and G' an angular locking-pawl pivoted on the said arm and provided with arms $g'$ and $g^2$, the former of which is normally thrust outward by means of a spring $g^3$ in the path of the internal teeth $e^2$ of the sprocket-wheel $e$.

G² represents a sliding piece mounted upon a suitable portion of the binder-frame to move radially to and from the shaft E, being thrust normally toward the said shaft by means of a suitable spring G³, and G⁴ represents a stop-arm pivoted upon the sliding piece G² and held normally in the line of travel of the arm $g^2$ of the pawl G', being provided with a shoulder $g^4$, with which the said arm of the pawl comes in contact during the rotation of the shaft E, as hereinafter described. The upper end of the sliding piece G² is provided with an inclined surface $g^5$, as shown in Fig. 10, and immediately below the same with a notch or recess $g^6$, having an inclined wall $g^7$ adjacent to the inclined surface $g^5$.

It being understood that the stop-arm G⁴ is suitably connected to the tripping mechanism in a manner hereinafter described, the operation of these parts is as follows: As the wheel $e$ rotates with the arm $g'$ of the locking-pawl G' in engagement with one of the teeth $e^2$ on the wheel $e$, the arm G will be carried around with the wheel and will cause the shaft E and the parts connected thereto to revolve. When the rotation is almost completed, the nose $g$ of the arm G will strike against the inclined surface $g^5$ of the sliding piece G² and cause the same to recede. The arm $g^2$ of the pawl G' will then come in contact with the shoulder $g^4$ of the stop-arm G⁴ and will throw the other arm of the pawl out of engagement with the teeth $e^2$, thereby severing the connection between the rotating wheel $e$ and the shaft E. In practice it is found desirable to give a slight movement to the locking-pawl after it is disengaged from the wheel, and this is effected by means of the sliding piece G², against the inclined wall $g^7$ of which the nose $g$ of the arm G now abuts, and, owing to the thrust of the spring G³, this sliding piece advances until the nose $g$ enters into the notch or seat $g^6$, when the parts are locked in the position shown in the drawings. Owing to this advancing movement of the sliding piece $G^2$ the arm $g'$ of the pawl $G'$ is moved still farther away from the tooth $e^2$, with which it was formerly in engagement, and by this means what was technically known as "knocking of the pawl" is prevented. It is obvious that the parts of the clutch mechanism will remain in the locked position until the withdrawal of the stop-arm $G^4$ from underneath the arm $g^2$ of the pawl by rotating the said stop-arm on its pivot, which latter result is effected by means of the tripping mechanism, which I will now proceed to describe.

The tripper H consists of a slide $h$, mounted upon a sustaining-bar H' (supported as hereinafter described) and capable of longitudinal movement upon the said arm and an arm $h'$, attached to the said slide and projecting above the upper surface of the deck $A^2$, as shown more particularly in Figs. 3 and 4 of the drawings.

$H^2$ indicates a bell-crank lever mounted on a lug projecting from the sustaining-bar H' and having one of its arms extending through a slot in the said bar to engage with one of a series of holes $h^2$ in the sliding tripper H. The other arm of the bell-crank lever $H^2$ is connected by means of a suitable rod $h^3$ to a bell-crank lever $H^3$, mounted on a stud projecting from a suitable portion of the binder-frame, (in this instance the sleeve-bearing of the needle-shaft.) The other arm of the bell-crank lever $H^3$ is connected by means of a rod $h^4$ to the stop-arm $G^4$, as clearly shown in Fig. 7.

$H^4$ indicates a spring coiled around the pivot of the bell-crank lever $H^3$ and having one of its ends connected to the said lever and its other end engaged in any desired one of the notches of a notched segment $H^5$.

The operation of these parts is as follows: When sufficient grain has been accumulated above the arm $h'$ of the tripper to form a bundle of the proper size, the pressure of the packer-arms transmitted through the said bundle will overcome the resistance of the spring $H^4$ and cause the sliding tripper to move downward upon the sustaining-bar H', thereby actuating the bell-crank levers $H^2$ and $H^3$ and connecting-rods $h^3$ and $h^4$ to withdraw the stop-arm $G^4$ from underneath the arm of the locking-pawl $G'$, as hereinbefore described, thus causing the said pawl to engage with the teeth of the sprocket-wheel, and thereby cause the rotation of the knotter-operating shaft E and rocking the needle-shaft F. By inserting the end of the bell-crank lever $H^2$ in different ones of the series of holes $h^2$ in the sliding tripper H the size of the bundle may be regulated in an obvious manner, since the connection between the bell-crank and sliding tripper regulates the period at which the sliding tripper operates the clutch mechanism. The tension of the spring $H^4$ may be regulated by inserting its free end in different ones of the series of notches in the segment $H^5$, thereby regulating the resistance which the sliding tripper will offer to the pressure exerted on the bundle by the packer-arms. In addition to this automatic means for tripping the stop-arm at suitable intervals, I have found it also desirable to provide means whereby the stop-arm may be tripped by hand at any desired moment, no matter how small may be the quantity of grain accumulated on the deck, and for this purpose I attach to the stop-arm, or to an upwardly-extending-arm $G^5$ thereof, a cord or chain $G^6$, which is led forward to within convenient reach of the driver, who may by a pull thereon trip the stop-arm at any desired moment. After the tripper has performed its function, as hereinbefore described, motion is communicated to the needle-shaft F, and consequently to the needle or binding arm $F^2$, which is mounted on said shaft. The needle is provided at its hub portion with a slotted segment $f^2$, with which engages a pin $i$ on the forward end of a bar I, mounted in lugs $i'$, attached to the under side of the sliding tripper H. A spring I', coiled around the sliding bar I, is introduced between the forward lug $i'$ and a pin $i^2$, passing through any one of a series of perforations in the bar. When the needle-arm F has almost completed its stroke, the outer end wall of the slot in the segment $f^2$ will engage the pin $i$ and will cause the bar I to move upward and inward, carrying with it the sliding tripper H, the arm $h'$ of which will compress the bundle during the operation of tying the ends of the cord surrounding the same. The force of the spring I' will, of course, be sufficient to overcome the resistance offered to the upward and inward motion of the sliding tripper while compressing the bundle. When the needle-arm returns to its former position, the remaining parts will, of course, return also to the position shown in the several figures of the drawings. By means of the series of holes in the bar I the position of the pin $i^2$ may be varied so as to regulate the pressure of the spring I' to conform to the resistance which it is to overcome.

The sustaining-bar H', which carries the tripping and compression mechanism, is mounted loosely upon the needle-shaft F, so that it may be allowed to drop after the bundle is formed, in order that the latter may be discharged from the machine. In order to support the sustaining-bar in its operative position, as shown in the several figures of the drawings, I provide a supporting-arm J, mounted on a shaft J', which is itself mounted in arms $j$, projecting from the sleeve-bearing of the needle-shaft, as shown in Fig. 27. A spring $j'$, coiled around the shaft J', holds the supporting-arm normally in an elevated position, as shown in full lines in Fig. 24 of the drawings, in which position the sustaining-bar H' rests against the end of the supporting-arm, an anti-friction roller $h^5$ being preferably employed at the point of contact.

$J^2$ indicates a pawl pivoted at $j^2$ on the supporting-arm J, and having one arm $j^3$ arranged in the path of a lug or projection J³, carried by the needle, while its other arm j⁴ abuts against an extension J⁴ of the shaft J', upon which the supporting-arm is mounted. A spring J⁵, coiled within a recess j⁵ in the under side of the pawl J², tends to hold the said pawl in the position shown in full lines in Fig. 24, with its arm j⁴ abutting against the pin J⁴, and thereby limiting its motion in this direction.

The operation of these parts is as follows: The needle-arm having completed its upward stroke, and the bundle having been bound, the parts are in the position shown in full lines in Fig. 24. Upon the return movement of the needle in the direction of the arrow in the said figure the lug J³ will come in contact with the arm j³ of the pawl J², and since the other arm j⁴ of the said pawl is in contact with the pin J⁴, and thereby prevents any rotation of the pawl upon its pivot, the pressure of the lug J³ against the said pawl will cause the supporting-arm J to move downward until it occupies the position shown in dotted lines in Fig. 24 and is clear of the sustaining-bar H', which will then drop to allow the bundle to be discharged. The needle, however, still continues its downward movement until the lug J³ comes in contact with the sustaining-bar H', as shown in full lines in Fig. 25, and, continuing its movement, will restore the sustaining-bar to its normal or raised position, as shown in full lines in Fig. 25. As soon as the lug has passed the pawl, however, the supporting-arm is again free to rise, being only prevented by its contact with the roller h⁵, and as the sustaining-bar is carried back, as just described, the supporting-arm will rise to its original position. When the needle begins another stroke, the supporting-arm will hold the sustaining-bar in an elevated position, and as the lug J³ in its movement comes in contact with the opposite side of the arm j³ of the pawl J² the pawl will yield, turning upon its pivot j², and allow the said lug to pass without displacing the supporting-arm. The spring J⁵ will, of course, return the pawl J² to its normal position immediately after the passage of the lug J³. By this means the sustaining-bar will be lowered to allow the bundle to be discharged and will be returned to its position as soon as the bundle is discharged.

The end-gate K is supported from the lower edge of the deck A² by means of a frame consisting of arms k, extending outward and downward from a shaft K', mounted in suitable bearings attached to a cleat a², secured to the under side of the deck A², as shown in Fig. 28 of the drawings, wherein that portion of the end-gate on one side of the binding mechanism is shown, the portion of the gate on the opposite side being similarly constructed. It will thus be seen that the end-gate is constructed of two separate parts arranged one on each side of the binding mechanism, and the arm k of each part adjacent to the binding mechanism is provided with an arm k', these latter arms extending toward each other and engaging from opposite sides with a slot h⁶, formed in the lower end of the sustaining-bar H'. It is obvious that when the sustaining-bar drops it will carry the end-gate with it, owing to the engagement of the arms k' with the slot in the sustaining-bar, the slot being of sufficient length to allow the two to drop together, although pivoted on different centers. It is also obvious that when the sustaining-bar is again raised to its normal position, as hereinbefore described, the end-gate will be similarly raised and will be held up by the sustaining-bar. The frame which supports the end-gate is preferably constructed in a single piece along with the arm k', and I have so shown it in the drawings, although it is obvious that it may be otherwise constructed.

In Figs. 11, 12, and 13 of the drawings I have shown in detail a tension device for giving a proper tension to the cord. This consists of a lug L, located on the back of the body-arm of the needle immediately adjacent to the hub thereon, and a flat spring-piece L', attached to the side of the needle and bearing against the side of the lug L, which is provided with a pin l, projecting through the spring L' to guide the latter and retain it in proper position. The cord l' passes through a suitable guide-piece L², located on the body-arm of the needle immediately below the lug L, and thence between the lug and spring-piece L' underneath the pin l, which prevents its being drawn from between the two. In the position of the parts shown in Fig. 11 of the drawings while the needle is making its upward stroke the cord is clamped between the lug and spring, which provide a proper tension upon it; but at the end of the stroke the end of the spring L will strike against a lug l² on the frame, as shown in Figs. 12 and 13 of the drawings and the spring will thereby be forced away from the lug to allow the cord to run freely while the needle is at rest. When the needle starts to make another upward stroke, the spring will pass free of the lug and will once more bear against the cord and form a tension for it.

The cam-wheel M is mounted upon the knotter-operating shaft E at the point where it passes through the knotter-frame N in the usual manner.

O indicates a swinging cord-holder frame, which is mounted loosely upon the knotter-operating shaft E and carries the usual cord-holder.

O' indicates a pawl sliding in suitable ways in the cord-holder frame O and caused to move longitudinally in the same by means of the bell-crank lever P, pivoted on the knotter-frame N, one arm of which p engages with the pawl O', while the other arm p' is provided with a roller which engages with the cam-groove M' in the cam-wheel M. The lower end of the pawl O' engages with the ratchet-wheel $o$ on the cord-holder shaft, being held up to its position by means of a suitable spring $o'$, so that at each downward stroke of the pawl it will impart to the cord-holder shaft a forward motion by means of its engagement with one of the teeth of the ratchet-wheel $o$, while at each upward stroke it will slide over the said tooth, the spring $o'$ yielding for this purpose, and will then engage with the next tooth to advance it on the next stroke.

$O^2$ indicates a pin projecting from the pawl O' through a slot $o^2$ in the cord-holder frame O, and also through a slot $n$ in the fixed knotter-frame N. It will be seen that as the slot $n$ is inclined to the vertical line, as shown in Fig. 16 of the drawings, and as the cord-holder frame O is loosely mounted, so that it has a constant tendency to assume a vertical position, the reciprocation of the pawl O' by means of the bell-crank lever P, as hereinbefore described, will, by reason of the engagement of the pin $O^2$ with the slots $o^2$ and $n$, cause the cord-holder frame to be swung positively toward the knotter-frame during the downward stroke of the pawl, while during its upward stroke the cord-holder frame will be swung back into the position shown in Figs. 15 and 16 of the drawings. The pawl O' thus serves the double purpose of swinging the cord-holder frame toward and from the knotter-frame and of advancing the cord-holder disk one notch at each stroke.

The cord-cutter consists of a right-angled arm Q, mounted upon a stud $q$, and having one of its arms provided with a knife Q' to sever the cord, while its other arm is provided with an anti-friction roller $q'$, arranged in the path of a small cam projection $m$ on the periphery of the cam-wheel M immediately at the end of the gear-segment thereon. When the cam projection $m$ comes in contact with the roller $q'$, it will cause the knife Q' to sever the cord in an obvious manner.

In the breast-plate R a slot $r$ is cut for the passage of the end of the needle or binding arm. The lower end of this slot is of irregular shape, as shown in Fig. 21 of the drawings, having a bend $r'$ to the right and then again to the left to bring the lower portion about in line with the upper portion. At the upper end of this bend is a projection $r^2$ on the breast-plate at the right-hand side of the slot in Fig. 21 extending inward across and above the slot, as shown in Figs. 20 and 22 of the drawings.

R' indicates a cord-stop consisting of a plate pivoted at $r^3$ upon the breast-plate R in the position shown in Fig. 20, and having an arm $R^2$ and slot $R^3$ adjacent thereto The plate R' is provided at its lower end with a pin $R^4$, which enters a slot $r^4$ in the swinging cord-holder frame O, so that the movement of the said frame will cause the cord-stop I' to move upon its pivot. When the needle is brought up to place the cord around the bundle and bring it to the knotter-hook, the cord-holder is in the position shown in Figs. 15 and 16 of the drawings, and the cord-stop R' is in the position shown in Fig. 20 of the drawings, the arm $R^2$ extending across the bend $r'$ in the slot in the breast-plate. The cord slips readily past the projection $r^2$ and is carried into the bend $r'$, where it is held in proper position to be caught by the knotter-hook in its revolution, the projection $r^2$ serving to prevent any accidental displacement of the cord in the direction of the upper portion of the slot $r$, while the arm $R^2$ of the cord-stop prevents any movement in the opposite direction.

By reason of the construction just described I am enabled to dispense with the cord placer or tucker, which is necessary in ordinary machines of this character. After the rotation of the knotter-hook, by means of which the knot is formed, the cord-holder swings forward, as hereinbefore described, carrying with it the cord-stop R', the slot $R^3$ in which then coincides with the lower extremity $r^5$ of the slot in the breast-plate. The purpose of this is as follows: The knotter-hook S at the end of its revolution assumes the position shown in Fig. 19 of the drawings, having the loop formed upon it and ready to be stripped. This is effected by means of the arms $M^2$ on the cam-shaft E, which strike the bundle and force it off the deck, thereby stripping the loop from the knotter-hook. In order to effect this it is necessary the strain should come upon the cord in such a direction as to pull it off the hook, and it is evident that this can only be accomplished by allowing the cord to fall in the lower end of the slot in the breast-plate. This is effected by the swinging of the cord-stop R', as hereinbefore described, which, after the formation of the loop, causes the slot $R^3$ therein to coincide with the slot $r^5$ and let the cord drop to the bottom of the slot.

The knotter-hook S is of the ordinary bill-hook type in its general features. The lower fixed jaw $s$ is, however, extended some little distance beyond the end of the upper movable jaw $s'$, and is provided upon this extension with a projection $s^2$ of a height equal to that of the end of the upper jaw, thereby forming a species of stop to better retain the back strands between the jaws of the hook during the operation of stripping the loop.

It will be observed that the tension device which regulates the passage of the cord is located on the body of the needle-arm and not on the arc-shaped guard of the needle-arm, and, moreover, that this tension device is located on said body near the shaft F, which forms its center of motion. By reason of this construction the take-up guides and other similar parts heretofore employed are dispensed with and the construction greatly simplified. It will also be seen that by the use of the tripping-connection, hereinbefore described, between the tripper and the clutch mechanism the strain upon the connecting parts is one of tension instead of the torsional strain which exists when a rock-shaft is employed, as in the usual construction. Owing to this difference in result I am enabled to employ much lighter parts, thereby reducing both the weight and cost of the apparatus.

I do not wish to be understood as limiting myself strictly to the precise details of construction hereinbefore described, and shown in the drawings, as it is evident that various modifications may be made therein without departing from the principle of my invention.

Having thus described my invention, what I claim as new, and desire to secure by Letters Patent, is—

1. In a grain-binder, the combination, with the knotter-operating shaft and packer-shaft, of a counter-shaft driven by the packer-shaft, sprocket-wheels mounted on the said counter-shaft and the knotter-operating shaft, and a sprocket-chain passing over the sprocket-wheels, substantially as and for the purposes specified.

2. In a grain-binder, the combination, with the knotter-operating shaft E, having sprocket-wheel $e$, and the packer-shaft C, having pinion $c'$, of the counter-shaft D, mounted in a bearing supported on the packer-shaft and adjustable around the same, said counter-shaft being provided with a pinion $d^2$, to mesh with the pinion $c'$, and with a sprocket-wheel $d'$, and a sprocket-chain E', passing over the sprocket-wheels $d'$ and $e$, substantially as and for the purposes specified.

3. The combination, with the packer-shaft C, having pinion $c'$, of the counter-shaft D, mounted in a bearing supported by arms $d$, loosely supported on the packer-shaft, curved slotted arm $c^2$, a bolt $d^3$, connecting one of the arms $d$ to the arm $c^2$, a pinion $d^2$, mounted on the counter-shaft and meshing with the pinion $c'$, and a sprocket-wheel $d'$, connected by a sprocket-chain with the sprocket-wheel on the cam-shaft, substantially as and for the purposes specified.

4. The combination, with the cam-shaft and sprocket-wheel, of the arm G, attached to the cam-shaft and carrying the locking-pawl, and the sliding piece $G^2$, carrying the stop-arm and having inclined surface $g^5$, and recess $g^6$, with inclined wall $g^7$, substantially as and for the purposes specified.

5. The combination, with the sliding tripper H and stop-arm $G^4$, of the bell-crank levers $H^2$ $H^3$ and connecting-rods $h^3$ and $h^4$, substantially as and for the purposes specified.

6. The combination, with the sliding tripper H and stop-arm $G^4$, of the bell-crank levers $H^2$ $H^3$ and connecting-rods $h^3$ $h^4$, and a spring $H^4$, of adjustable tension, connected to one of the bell-crank levers, substantially as and for the purposes specified.

7. The combination, with the sliding tripper and stop-arm and the bell-crank levers and connecting-rods, of the spring $H^4$, coiled around the pivot of one of the bell-crank levers, and having one of its ends connected to the said lever and its other end retained by the notched segment $H^5$, substantially as and for the purposes specified.

8. The combination, with the sliding tripper H, provided with a series of holes $h^2$, of the bell-crank lever $H^2$, having one of its arms in engagement with one of the holes in the tripper and its other arm connected to the stop-arm $G^4$, substantially as and for the purposes specified.

9. The combination, with the needle-arm provided with a slotted segment $f^2$, of the sliding tripper H and the sliding spring-bar I, carried by the tripper and having a pin $i$ to engage with the slotted segment, substantially as and for the purposes specified.

10. The combination, with the needle-arm $F^2$, having slotted segment $f^2$, of the sliding tripper H, having lugs $i'$; the sliding bar I, having pin $i$ to engage the slotted segment and mounted in the lugs $i'$, and the spring I', coiled around the said bar and bearing against the upper lug $i$ and the adjustable pin $i^2$, substantially as and for the purposes specified.

11. In a grain-binder, the combination, with the sheaf-sustaining bar, of the pivoted and spring-controlled supporting-arm arranged in the path of said bar and adapted to engage directly with and support the same when elevated, but not positively connected thereto, a spring-pawl mounted on said supporting-arm and free to move in one direction only, and the needle-arm provided with a single projection to engage the sustaining-bar to carry the same positively upward and to engage the spring-pawl to trip the supporting-arm, substantially as and for the purposes specified.

12. In a grain-binder, the combination, with the swinging sheaf-sustaining bar H', of the spring-controlled supporting-arm J and its pivot $J^4$, the spring-pawl $J^2$, provided with two arms, one of which is held normally against the pivot $J^4$, while the other is arranged in the path of the projection on the needle-arm, and the needle-arm $F^2$, provided with a projection $J^3$ to engage with the second arm of the spring-pawl and with the sustaining-bar, substantially as and for the purposes specified.

13. In a grain-binder, the combination, with the swinging sheaf-sustaining bar H', having elongated slot $h^6$, of the end-gate K, pivoted to the under side of the deck $A^2$ and constructed in two sections, arranged one on each side of the sustaining-bar, and provided with arms $k'$, engaging the slot $h^6$, substantially as and for the purposes specified.

14. The combination, with the knotter-frame provided with slot $n$ and the swinging cord-holder frame having slot $o^2$, of the sliding pawl O', which actuates the cord-holder, the said pawl being provided with a pin $O^2$, passing through the slots $o^2$ and $n$, substantially as and for the purposes specified.

15. In a grain-binder, the combination, with the swinging cord-holder and its frame, of a pawl mounted thereon actuated by the cam-wheel and engaging both the cord-holder and its frame, whereby said pawl simultaneously rotates the cord-holder and swings the cord-holder frame, substantially as and for the purposes specified.

16. In a grain-binder, the combination, with the knotter-frame provided with a slot, of the cam-wheel M, having cam-groove M', the bell-crank lever P, pivoted on the knotter-frame and operated by said cam-groove, and the swinging cord-holder frame O, provided with a slot and having pawl O', operated by the bell-crank lever, and provided with a pin passing through said slots, whereby the said pawl operates to simultaneously rotate the cord-holder and swing the cord-holder frame, substantially as and for the purposes specified.

17. In a grain-binder, the combination, with the breast-plate R, having slot $r$, with bend $r'$, projection $r^2$, extending over the slot above the bend, and lower extension $r^5$, of the cord-stop R', having arm $R^2$, and slot $R^3$ and the swinging cord-holder frame connected to the said cord-stop to operate the same, substantially as and for the purposes specified.

18. The combination, with the swinging cord-holder frame, of the breast-plate R, slotted as described, and the cord-stop R', pivoted to the breast-plate at $r^3$ and having a pin $R^4$ to engage the slot $r^4$ in the swinging cord-holder frame, substantially as and for the purposes specified.

19. In a grain-binder, the main or cam shaft, the driving-wheel mounted loosely thereon, a spring-clutch for connecting said wheel to the shaft, a bracket secured on the shaft, and a stop-arm for disconnecting the spring-clutch, in combination with a spring locking-bolt adapted to engage the bracket to move the shaft slightly after the pawl is disconnected from the wheel, substantially as and for the purposes specified.

JOSEPH W. BLOOD.

Witnesses:
S. L. SPEAR,
MILO C. DEWEY.